United States Patent
Tamai

(10) Patent No.: US 11,174,423 B2
(45) Date of Patent: Nov. 16, 2021

(54) ADDITIVE FOR OIL WELL CEMENT, AND CEMENT COMPOSITION AND CEMENT SLURRY BOTH INCLUDING SAID ADDITIVE FOR OIL WELL CEMENT

(71) Applicant: DENKA COMPANY LIMITED, Tokyo (JP)

(72) Inventor: Hiroshi Tamai, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 39 days.

(21) Appl. No.: 16/300,993

(22) PCT Filed: May 11, 2017

(86) PCT No.: PCT/JP2017/017787
§ 371 (c)(1),
(2) Date: Nov. 13, 2018

(87) PCT Pub. No.: WO2017/195855
PCT Pub. Date: Nov. 16, 2017

(65) Prior Publication Data
US 2020/0199433 A1    Jun. 25, 2020

(30) Foreign Application Priority Data

May 13, 2016    (JP) .............................. JP2016-096672

(51) Int. Cl.
*C09K 8/487* (2006.01)
*C04B 24/26* (2006.01)

(52) U.S. Cl.
CPC .......... *C09K 8/487* (2013.01); *C04B 24/2623* (2013.01)

(58) Field of Classification Search
CPC ...................................................... C09K 8/46
See application file for complete search history.

(56) References Cited

U.S. PATENT DOCUMENTS

| | | | |
|---|---|---|---|
| 4,967,839 A * | 11/1990 | Carpenter | C04B 28/04 106/665 |
| 6,350,808 B1 | 2/2002 | Schmitz et al. | |
| 2006/0041060 A1 | 2/2006 | George et al. | |
| 2008/0293884 A1* | 11/2008 | Tanimoto | C08L 31/04 524/852 |
| 2011/0042086 A1 | 2/2011 | Drochon | |
| 2015/0184059 A1* | 7/2015 | Witham | C09K 8/487 166/293 |
| 2016/0083490 A1* | 3/2016 | Kumaki | C08J 3/00 525/330.6 |
| 2017/0174971 A1 | 6/2017 | Kumaki et al. | |

FOREIGN PATENT DOCUMENTS

| | | |
|---|---|---|
| JP | H09-285287 A | 11/1997 |
| JP | 2002-104853 A | 4/2002 |
| JP | 3310428 B2 | 8/2002 |
| JP | 4052497 B2 | 2/2008 |
| JP | 2008-510846 A | 4/2008 |
| WO | 2007/146348 A2 | 12/2007 |

OTHER PUBLICATIONS

Europe Patent Office, "Search Report for European Patent Application No. 17796213.1," dated May 3, 2019.
PCT/ISA/210, "International Search Report for International Application No. PCT/JP2017/017787," dated Jun. 20, 2017.

\* cited by examiner

*Primary Examiner* — Angela M DiTrani Leff
*Assistant Examiner* — Avi T Skaist
(74) *Attorney, Agent, or Firm* — Manabu Kanesaka

(57) ABSTRACT

Provided is a PVA-containing additive for oil well cement superior in fluid loss-reducing property. Specifically, provided is an additive for oil well cement, the additive containing polyvinyl alcohol having a saponification value of 75 to 85 mol % and a viscosity-average polymerization degree of 2,800 to 4,500. Also provided are a cement composition containing the additive for oil well cement in an amount of 0.01 to 30% bwoc and a cement slurry containing the additive for oil well cement in an amount of 0.01 to 30% bwoc.

5 Claims, No Drawings

ADDITIVE FOR OIL WELL CEMENT, AND CEMENT COMPOSITION AND CEMENT SLURRY BOTH INCLUDING SAID ADDITIVE FOR OIL WELL CEMENT

RELATED APPLICATIONS

The present application is National Phase of International Application No. PCT/JP2017/017787 filed May 11, 2017, and claims priority from Japanese Application No. 2016-096672, filed May 13, 2016, the disclosure of which is hereby incorporated by reference herein in its entirety.

TECHNICAL FIELD

The present invention relates to an additive for oil well cement containing polyvinyl alcohol.

BACKGROUND ART

Oil well cements that are used in cementing oil wells, gas wells, and water wells are injected into the space between a steel pipe and a wellbore for protection of the steel pipe (casing). Reduction in the amount of fluid in cement slurry by high pressure and underground heat during injection leads to deterioration in fluidity of the cement slurry and intensity of the cement after hardening and thus, a fluid loss-reducing agent is added.

Polyvinyl alcohol (hereinafter, referred to as PVA) has been used normally as the fluid loss-reducing agent. Recently, deeper gas wells have been constructed particularly for shale gas production and thus, the requirements on pressure and temperature are becoming stricter and the amount of the fluid loss-reducing agent added is also increasing. However, increase in the amount of the fluid loss-reducing agent added may lead to a problem of deterioration in fluidity of the cement slurry by thickening and increase in the amount of the fluid loss-reducing agent added also leads to increase in cost. Accordingly, there exists a need for improvement in fluid loss-reducing property of the additive.

Although there is description on the PVA used as the fluid loss-reducing agent in Patent Documents 1 and 2, fluid loss-reducing property demanded for cement slurries injected at high temperature and high pressure are described only insufficiently.

CITATION LIST

Patent Documents

Patent Document 1: WO2007/146348
Patent Document 2: Japanese Patent Application No. 2015-196733

SUMMARY OF THE INVENTION

Technical Problem

Although there are various improvements for the PVA-containing fluid loss-reducing agent, the fluid loss-reducing property of those for oil-well cements, which are injected under high temperature and high pressure, is still insufficient, as described above.

A main object of the present invention is to provide a PVA-containing additive for oil well cement that is superior in fluid loss-reducing property.

Solution to Problem

After intensive studies for such a PVA for use as the additive for oil well cement, the present inventors have found that saponification value and viscosity-average polymerization degree of PVA influence significantly on the fluid loss-reducing property of the PVA-containing additive and made the present invention.

Specifically, the present invention provides first an additive for oil well cement, the additive containing polyvinyl alcohol having a saponification value of 75 to 85 mol % and a viscosity-average polymerization degree of 2,800 to 4,500. The content of the polyvinyl alcohol particles having a particle diameter of 75 μm or less contained in the additive for oil well cement according to the present invention may be set to 30 mass % or less and the content of the polyvinyl alcohol particles having a particle diameter of 500 μm or more to 10 mass % or less.

The present invention additionally provides a cement composition containing the additive for oil well cement described above in an amount of 0.01 to 30% bwoc and a cement slurry containing the additive for oil well cement described above in an amount of 0.01 to 30% bwoc.

Advantageous Effects of Invention

It is possible, according to the present invention, to improve the fluid loss-reducing property of the PVA-containing additive for oil well cement.

DESCRIPTION OF EMBODIMENTS

Hereinafter, favorable embodiments of the present invention will be described. The embodiments described below are only some of the examples of typical embodiments of the present invention and it should be understood that the scope of the present invention shall not be restricted by these embodiments.

The present invention provides a polyvinyl alcohol (hereinafter referred to as "PVA") that is controlled on saponification value and viscosity-average polymerization degree and can be used favorably as an additive for oil-well cements that are used in cementing oil wells, gas wells, and water wells.

A method of mixing cement, water, and various additives into slurry and pump-injecting the slurry thus prepared is widely used in injecting a cement into the space between a steel pipe and a wellbore. When PVA is used as the fluid loss-reducing agent, one of the additives, the resin swells in the slurry, inhibiting the fluid loss from the cement slurry caused by high pressure and underground heat during injection.

By controlling the saponification value and the viscosity-average polymerization degree of the PVA then, it is possible to improve the fluid loss-reducing property of the additive for oil well cement. It is also possible to improve the fluid loss-reducing property of the additive for oil well cement further by controlling the saponification value, the viscosity-average polymerization degree, and additionally the particle diameter of the PVA.

<Additive for Oil Well Cement>

The additive for oil well cement according to the present invention is characterized by containing a PVA having a particular saponification value and a particular viscosity-average polymerization degree.

The PVA contained in the additive for oil well cement according to the present invention preferably has a saponification value of 75 to 85 mol %, more preferably 78 to 82 mol %. It is possible by making the saponification value 85 mol % or less to prevent excessive increase of hydrogen bonding between PVA molecules and inhibit deterioration of swelling, thus preventing deterioration of the fluid loss-reducing property. It is also possible by making the saponification value 75 mol % or more to prevent excessive increase in water solubility of the PVA and inhibit solubilization of the PVA in the cement slurry, thus preventing deterioration of the fluid loss-reducing property. The "saponification value", as used in the present specification, is a value as determined and calculated according to "3.5 Saponification value" of JIS K6726.

The PVA contained in the additive for oil well cement according to the present invention preferably has a viscosity-average polymerization degree of 2,800 to 4,500, more preferably 3,000 to 3,800 and particularly preferably 3,300 to 3,700. It is possible by making the viscosity-average polymerization degree 4,500 or less to make production of the PVA easier and improve its productivity. It is possible by making the viscosity-average polymerization degree 2,800 or more to prevent excessive increase in water solubility of the PVA and inhibit solubilization thereof in cement slurry, thus preventing deterioration in the fluid loss-reducing property.

The "viscosity-average polymerization degree", as used in the present specification, is calculated from the limiting viscosity $[\eta]$ (g/dL), as determined at 30° C. using ion-exchange water as the solvent with an Ostwald viscometer, according to the following Formula (1):

$$\log(P)=1.613\times\log([\eta]\times 104/8.29) \quad (1)$$

In the formula, P represents viscosity-average polymerization degree.

The content of the PVA particles having a particle diameter of 75 μm or less in the additive for oil well cement according to the present invention is preferably 30 mass % or less, more preferably 25 mass % or less, and further more preferably 15 mass % or less. When the PVA particles have an excessively small particle diameter, the PVA dissolves in the cement slurry, possibly causing a problem of deterioration in fluid loss-reducing property. It is possible by controlling the content of particles having a particle diameter of 75 μm or less to 30 mass % or less to prevent solubilization of the PVA in the cement slurry and improve the fluid loss-reducing property.

The content of the PVA particles having a particle diameter of 500 μm or more in the additive for oil well cement according to the present invention is preferably 10 mass % or less, more preferably 8 mass % or less, and further more preferably 5 mass % or less. When the PVA particles have an excessively large particle diameter, they may cause a problem in uniformity in mixing and dispersibility in the cement. It is possible by controlling the content of the particles having a particle diameter of 500 μm or more to 10 mass % or less to mix and disperse the PVA particles uniformly in cement.

In the present specification, the PVA may be, for example, a polymer obtained by complete or partial saponification of a polyvinyl ester obtained by polymerization of a vinyl ester such as vinyl acetate. The "polymer" is a polymer according to the definition by International Union of Pure and Applied Chemistry (IUPAC) Macromolecular Nomenclature Commission. According to the International Union of Pure and Applied Chemistry (IUPAC) Macromolecular Nomenclature Commission, a macromolecule is defined as "a molecule of high relative molecular mass, the structure of which essentially comprises the multiple repetition of units derived, actually or conceptually, from molecules of low relative molecular mass."

The PVA may be a homopolymer of a vinyl ester or a copolymer of a vinyl ester and a non-vinyl ester monomer copolymerizable with the vinyl ester. It is preferably a homopolymer of vinyl ester from the viewpoint of the stability of the PVA obtained.

Examples of the vinyl esters include vinyl acetate, vinyl propionate, vinyl valerate, vinyl caprate, vinyl laurate, vinyl stearate, vinyl benzoate, and vinyl pivalate. Vinyl acetate is preferable from the viewpoint of easiness in polymerization.

Examples of the non-vinyl ester monomers copolymerizable with the vinyl ester include $\alpha$-olefin monomers such as ethylene and propylene; alkyl (meth)acrylate ester monomers such as methyl (meth)acrylate, ethyl (meth)acrylate, butyl (meth)acrylate, and 2-ethylhexyl (meth)acrylate; unsaturated amide monomers such as (meth)acrylamide and N-methylol acrylamide; unsaturated carboxylic acid monomers such as (meth)acrylic acid, crotonic acid, maleic acid, itaconic acid, and fumaric acid; alkyl(methyl, ethyl, propyl, etc.) ester monomers of unsaturated carboxylic acids; unsaturated carboxylic anhydrides such as maleic anhydride; salts (such as sodium, potassium, and ammonium) of unsaturated carboxylic acids; glycidyl group-containing monomers such as allyl glycidyl ether and glycidyl (meth)acrylate; sulfonic acid group-containing monomers such as 2-acrylamide-2-methylpropanesulfonic acid or the salts thereof, phosphoric acid group-containing monomers such as acid phosphoxyethyl methacrylate and acid phosphoxypropyl methacrylate; and alkyl vinyl ether monomers.

The polymerization method of the polyvinyl ester is not particularly limited, if it does not impair the advantageous effects of the present invention and a known polymerization method, such as solution polymerization, suspension polymerization, or bulk polymerization, can be used. Use of a solution polymerization method in alcohol is preferable from the viewpoints of easiness in operation and possible use of a solvent common to the saponification reaction in the next step.

The polyvinyl ester obtained is dissolved in alcohol and saponified in the presence of an alkali catalyst or an acid catalyst. Examples of the alcohols include methanol, ethanol, and butanol. The concentration of the polyvinyl ester in the alcohol is not particularly limited, but preferably 5 to 80 mass % as solid matter concentration. Examples of the alkali catalysts that may be used include alkali metal hydroxides and alcoholates such as sodium hydroxide, potassium hydroxide, sodium methylate, sodium ethylate, and potassium methylate. Examples of the acid catalysts that may be used include aqueous inorganic acid solutions such as hydrochloric acid and sulfuric acid and organic acids such as p-toluenesulfonic acid. The amount of these catalysts used is not particularly limited, but preferably 0.1 to 100 millimolar equivalence with respect to vinyl acetate. The reaction temperature during saponification is also not particularly limited, but preferably in the range of 10 to 70° C., more preferably in the range of 30 to 50° C. The reaction time is not particularly limited and may be, for example, 1 to 10 hours.

<Cement Composition and Cement Slurry>

The cement composition and the cement slurry according to the present invention are characterized by containing the additive for oil well cement according to the present invention described above in a particular amount.

The method of adding the PVA to the cement slurry is not particularly limited, if it does not impair the advantageous effects of the present invention, and a common method such as a method of mixing it previously to a dry cement composition or a method of mixing it during preparation of cement slurry, is used.

The amount of the PVA added is also not particularly limited, if it does not impair the advantageous effects of the present invention, and it is preferably 0.01 to 30% bwoc, more preferably 0.05 to 10% bwoc, and further more preferably 0.1 to 5% bwoc. The term, "by weight of cement" (bwoc), is defined as the weight of a dry additive added to a cement composition with respect to the solid matter of cement.

EXAMPLES

Hereinafter, the present invention will be described more in detail with reference to Examples. The Examples described below are only some examples of the typical Examples of the present invention and it should be understood that the scope of the present invention shall not be restricted by these Examples. The "part" and "%" below respectively mean "part by mass" and "mass %," unless specified otherwise.
<Preparation of PVA>

Example 1

100 parts by mass of vinyl acetate, 5.3 parts by mass of methanol, and 0.02 mol % of azobisisobutyronitrile were placed in a polymerization tank equipped with a reflux condenser, a dropping funnel, and a stirrer and the mixture was allowed to polymerize, as it was stirred at its boiling temperature for 4.0 hours under a nitrogen gas stream. Unreacted vinyl acetate monomer was then discharged out of the polymerization system, to give a methanol solution of a polyvinyl acetate having a polymerization degree of 3,500.

A methanol solution of sodium hydroxide (0.004 mole of sodium hydroxide to vinyl acetate) was added to the polyvinyl acetate methanol solution thus obtained and the mixture was subjected to saponification reaction at 40° C. for 150 minutes. The reaction solution obtained was dried under heat, to give a PVA of Example 1 having a saponification value of 80 mol %.

After drying, the PVA particles were sieved with a screen having an opening of 500 μm. The PVA particles remaining on the screen were pulverized in a pulverizer and mixed thoroughly with the PVA particles previously sieved, to give a PVA containing particles of a particle diameter of 75 μm or less in an amount of 22%.

Examples 2 to 6 and Comparative Examples 1 to 7

PVAs of Examples 2 to 6 and Comparative Examples 1 to 7 were obtained in a manner similar to Example 1, except that the amount of methanol during polymerization, the amount of sodium hydroxide during saponification, and the opening of the screen used during particle diameter adjustment were changed to those shown in Table 1 below.
<Calculation of Viscosity-Average Polymerization Degree of PVA>

The limiting viscosity [η] (g/dL) of the PVAs obtained in Examples 1 to 6 and Comparative Examples 1 to 7, was determined and the viscosity-average polymerization degree was calculated according to the Formula (1) above.
<Evaluation of Fluid Loss-Reducing Property>

The fluid loss-reducing property of PVA was determined according to the fluid loss test method of a specification of American Petroleum Institute (API) 10B-2 (April, 2013) and the fluid loss obtained was expressed by cc. In the following Examples, it was determined at a slurry density of 1,900 kg/m³. The amount of PVA added was determined under a condition of 0.25% bwoc at an evaluation temperature of 20° C., 0.4% bwoc at 40° C., or 0.6% bwoc at 60° C.
<Results>

Results are summarized in the following Table 1.

TABLE 1

| | | Example | | | | | | | Comparative Example | | | | | |
|---|---|---|---|---|---|---|---|---|---|---|---|---|---|---|
| | | 1 | 2 | 3 | 4 | 5 | 6 | 7 | 1 | 2 | 3 | 4 | 5 | 6 |
| Polyvinyl acetate polymerization condition Methanol (parts) | | 5.3 | 5.3 | 5.3 | 2.3 | 10 | 5.3 | 10 | 15 | 15 | 15 | 15 | 20 | 10 |
| Saponification condition Sodium hydroxide (mole)*1 | | 0.004 | 0.008 | 0.002 | 0.004 | 0.004 | 0.004 | 0.010 | 0.015 | 0.010 | 0.004 | 0.012 | 0.016 | 0.0010 |
| Particle diameter adjustment condition Screen opening (μm) | | 300 | 300 | 300 | 300 | 300 | 500 | 500 | 300 | 300 | 300 | 180 | 500 | 300 |
| Properties of PVA | Saponification value (mol %) | 80 | 84 | 76 | 80 | 80 | 80 | 80 | 96 | 88 | 80 | 91 | 99 | 88 |
| | Viscosity-average polymerization degree | 3500 | 3500 | 3500 | 3800 | 2800 | 3500 | 2800 | 2400 | 2400 | 2400 | 2400 | 1700 | 2800 |
| | Particle diameter 75 μm or less (%) | 0 | 0 | 0 | 0 | 0 | 1 | 0 | 0 | 0 | 0 | 0 | 0 | 0 |
| | 500 μm or more (%) | 22 | 23 | 22 | 22 | 23 | 10 | 45 | 22 | 23 | 24 | 44 | 8 | 22 |
| Fluid loss | 20° C. (cc) | 12 | 14 | 13 | 11 | 12 | 10 | 19 | 18 | 14 | 18 | 24 | 460 | 14 |
| | 40° C. (cc) | 12 | 17 | 14 | 12 | 22 | 11 | 45 | 48 | 26 | 48 | 590 | *2 | 14 |
| | 60° C. (cc) | 10 | 30 | 15 | 11 | 50 | 11 | 90 | 900 | 690 | 140 | *2 | *2 | 1070 |

*1 moles with respect to vinyl acetate
*2 not determined

As shown in Table 1, the cement slurries of Examples 1 to 7, which contained a PVA having a saponification value of 75 to 85 mol % and a viscosity-average polymerization degree of 2,800 to 4,500, gave a fluid loss smaller than those of Comparative Examples 1 to 6 which contained a PVA having a saponification value and/or a viscosity-average polymerization degree outside the scope of the present invention. More specifically, for example when Example 1 and Comparative Example 3, wherein a PVA having a saponification value of 80 mol % was used, are compared, the cement slurry containing a PVA having a viscosity-average polymerization degree of less than 2,800 of Comparative Example 3 gave a larger fluid loss, compared to the cement slurry of Example 1 containing a PVA having a viscosity-average polymerization degree in the range of 2,800 to 4,500. Alternatively when Example 5 and Comparative Example 6, wherein the a PVA having a viscosity-average polymerization degree of 2,800 was used, are compared, the cement slurry of Comparative Example 6 containing a PVA having a saponification value of more than 85 mol % gave a significantly larger fluid loss at 60° C., compared to the cement slurry of Example 5 containing a PVA having a saponification value in the range of 75 to 85 mol %.

These results suggest that use of a PVA having a saponification value of 75 to 85 mol % and a viscosity-average polymerization degree of 2,800 to 4,500 leads to improvement in fluid loss-reducing property.

When the cement slurries of Examples are compared, the slurry of Example 1 containing a PVA having a saponification value in the range of 78 to 82 mol % gave a smaller fluid loss, compared to the cement slurries of Examples 2 and 3 respectively containing a PVA having a saponification value outside the range above. The result suggests that the saponification value of the PVA contained in the additive for oil well cement according to the present invention is more preferably controlled to 78 to 82 mol %.

Further, the cement slurry of Example 1 containing a PVA having a viscosity-average polymerization degree of 3,000 or more gave a smaller fluid loss, compared to the cement slurry of Example 5 containing a PVA having a viscosity-average polymerization degree of less than 3,000. The result suggests that the viscosity-average polymerization degree of the PVA contained in the additive for oil well cement according to the present invention is more preferably controlled to 3,000 or more.

Further when the cement slurries of Examples 5 and 7, which contained a PVA having the same saponification value and viscosity-average polymerization degree, are compared, the cement slurry of Example 5 containing PVA particles having a PVA particle diameter of 75 μm or less in an amount of 30% or less gave a smaller fluid loss. Alternatively when the cement slurries of Examples 1 and 6, which contained a PVA having the same saponification value and viscosity-average polymerization degree, are compared, the cement slurry of Example 6 containing PVA particles having a particle diameter of 75 μm or less in an amount of 15% or less gave a smaller fluid loss. The result suggests that the content of PVA particles having a particle diameter of 75 μm or less in the additive for oil well cement according to the present invention is preferably 30% or less, more preferably 15% or less.

The invention claimed is:

1. An additive for oil well cement comprising polyvinyl alcohol particles containing a polyvinyl alcohol having a saponification value of 75 to 85 mol % and a viscosity-average polymerization degree of 2,800 to 4,500, wherein the polyvinyl alcohol particles comprise particles having a particle diameter in a range greater than 0 μm and not more than 75 μm in an amount of a range greater than 0 and not more than 25 mass % in 100 mass % of the particles, particles having a particle diameter of 500 μm or more in an amount of a range equal to or greater than 0 and not more than 10 mass % in 100 mass % of the particles, and particles having a particle diameter in a range greater than 75 μm to less than 500 μm in an amount of balance in 100 mass % of the particles.

2. The additive for oil well cement according to claim 1, wherein the viscosity-average polymerization degree is 2,800 to 3,800.

3. A cement composition containing an additive for oil well cement in an amount of 0.01 to 30% bwoc,
wherein the additive comprises polyvinyl alcohol particles containing polyvinyl alcohol having a saponification value of 75 to 85 mol % and a viscosity-average polymerization degree of 2,800 to 4,500, and
wherein the polyvinyl alcohol particles comprise particles having a particle diameter in a range greater than 0 and not more than 75 μm in an amount of a range greater than 0 and not more than 25 mass % in 100 mass % of the particles, particles having a particle diameter of 500 μm or more in an amount of a range equal to or greater than 0 and not more than 10 mass % in 100 mass % of the particles, and particles having a particle diameter in a range greater than 75 μm to less than 500 μm in an amount of balance in 100 mass % of the particles.

4. The cement composition according to claim 3, wherein the additive for oil well cement is added in an amount of 0.01 to 5% bwoc.

5. A cement slurry containing an additive for oil well cement in an amount of 0.01 to 30% bwoc,
wherein the additive comprises polyvinyl alcohol particles containing polyvinyl alcohol having a saponification value of 75 to 85 mol % and a viscosity-average polymerization degree of 2,800 to 4,500, and
wherein the polyvinyl alcohol particles comprise particles having a particle diameter in a range greater than 0 and not more than 75 μm in an amount of a range greater than 0 and not more than 25 mass % in 100 mass % of the particles, particles having a particle diameter of 500 μm or more in an amount of a range equal to or greater than 0 and not more than 10 mass % in 100 mass % of the particles, and particles having a particle diameter in a range greater than 75 μm to less than 500 μm in an amount of balance in 100 mass % of the particles.

* * * * *